Sept. 22, 1959   A. W. ANDERSON   2,905,341
ARTICLE FEEDING AND STACKING MECHANISMS
Filed Feb. 26, 1957   2 Sheets-Sheet 1
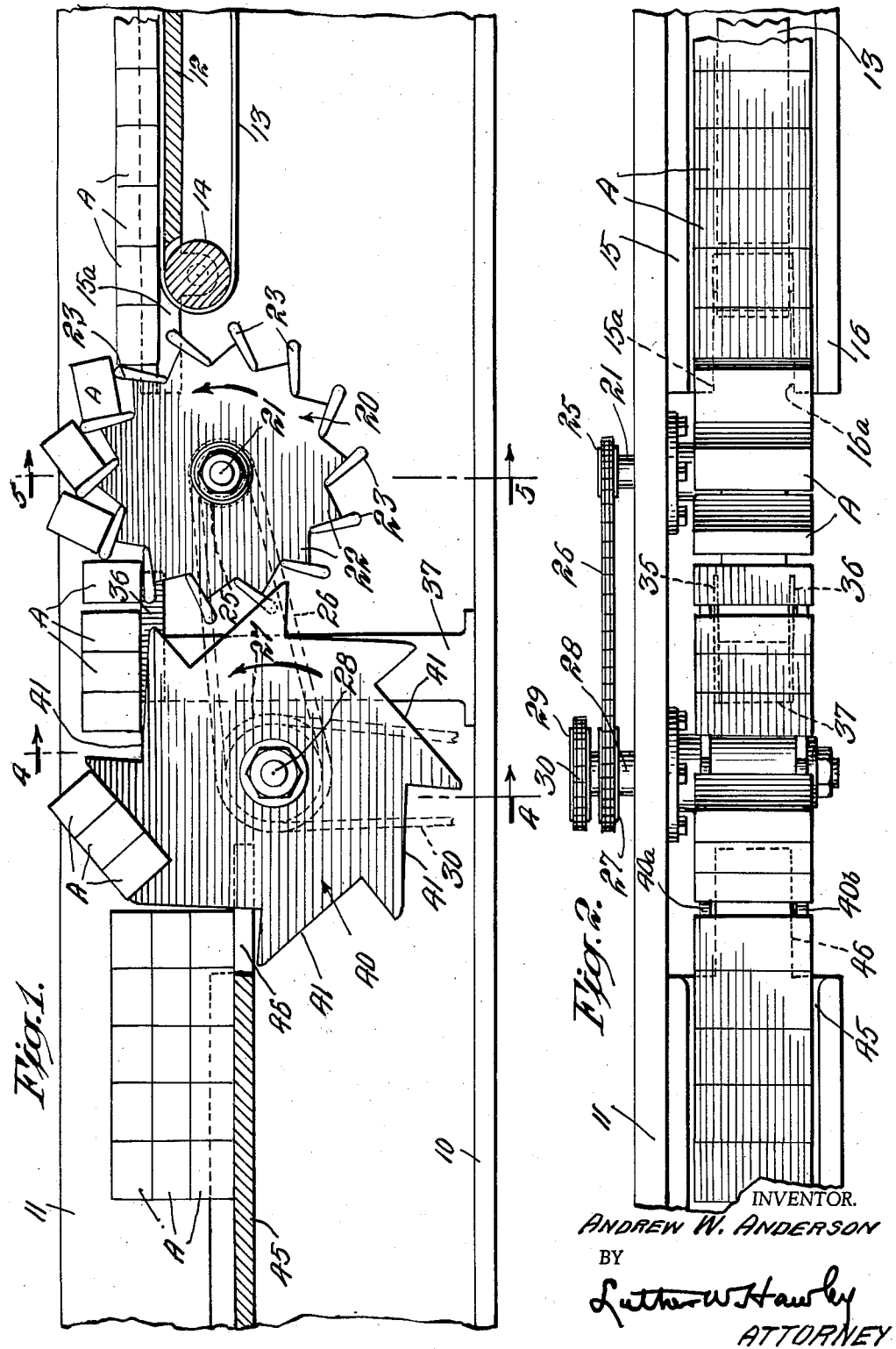
INVENTOR.
ANDREW W. ANDERSON
BY
ATTORNEY

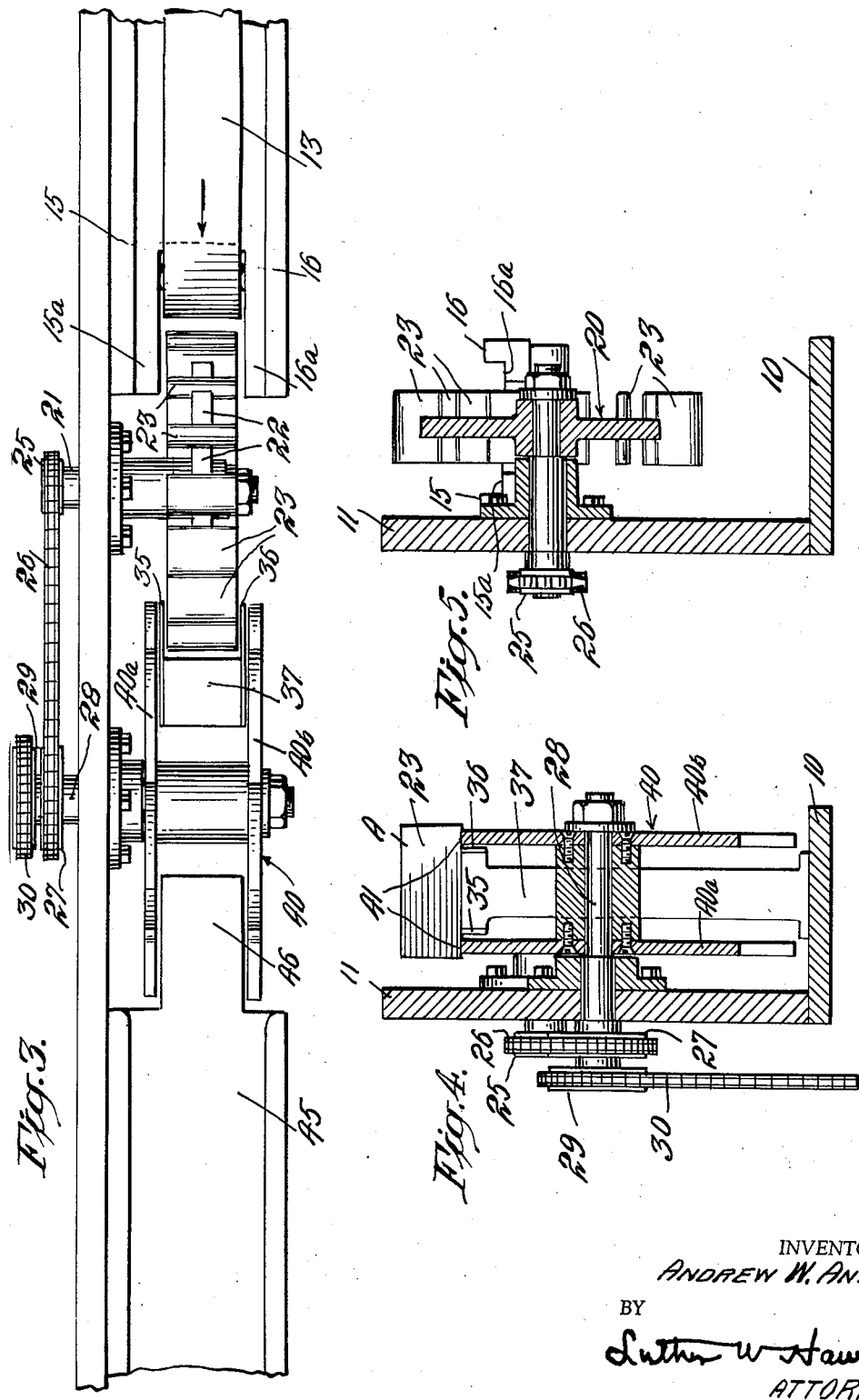

United States Patent Office 2,905,341
Patented Sept. 22, 1959

2,905,341

ARTICLE FEEDING AND STACKING MECHANISMS

Andrew W. Anderson, Nutley, N.J., assignor to Scandia Packaging Machinery Company, a corporation of New Jersey Application February 26, 1957, Serial No. 642,467

2 Claims. (Cl. 214—6)

This invention relates to article feeding and stacking mechanism.

The invention has for its salient object to provide simple and practical feeding and stacking mechanism that comprises a minimum number of parts and will operate efficiently.

Further objects of the invention will appear from the following specification taken in connection with the drawings which form a part of this application, and in which Fig. 1 is an elevational view of mechanism embodying the invention;

Fig. 2 is a top plan view of Fig. 1;

Fig. 3 is a top plan view of the apparatus, similar to Fig. 2 but omitting the article so as to more clearly show the feeding and stacking mechanism;

Fig. 4 is a vertical sectional elevation taken substantially on line 4—4 of Fig. 1, looking in the direction of the arrows; and Fig. 5 is a vertical sectional elevation taken substantially on line 5—5 of Fig. 1, looking in the direction of the arrows.

In the particular embodiment of the invention illustrated, the apparatus or mechanism comprises a base 10 and a back plate or support 11 on which the mechanism is mounted.

At one end of the apparatus there is shown a table or support 12, on which is mounted an endless conveyor 13, the conveyor being supported at one end on a roller 14, the other end not being shown.

The articles A are fed into the machine on the conveyor 13, the ends of the articles being supported on rails or ledges 15 and 16 which are disposed at the sides of the conveyor 13. These ledges extend beyond the delivery end of the conveyor, as shown at 15a and 16a.

An index or star wheel 20 is mounted on a spindle 21 supported on the back plate 11 and this wheel has a plurality of ledges 22 on which are mounted bars or paddles 23. From the showing particularly in Fig. 3 it will be noted that the bars or paddles 23 pass between the portions 15a and 16a of the ledges and engage the articles A, one at a time, and lift them from the ledges as the wheel 20 rotates in the direction of the arrow shown in Fig. 1. As shown, the articles, when lifted from the ledges, are supported from the bottom by one of the bars or paddles 23 and the front side of the article is engaged against the bar or paddle in advance of the paddle supporting the bottom.

As shown in the drawings, the shaft 21 has a sprocket 25 which is driven by a chain 26 which also is mounted on a sprocket 27 carried by a shaft 28. The shaft 28 has also secured thereto a sprocket 29 which is driven from any suitable source of power by a chain 30.

Attention is called to the fact that the sprocket 25 is a small sprocket, whereas, the sprocket 27 is a large sprocket.

When the wheel 20 has rotated through a predetermined arc, the articles A carried by the bars 23 are delivered to a pair of supporting bars 35 and 36 between which the bars 23 can pass, as shown in Fig. 3. The bars 35 and 36 are mounted on the upper end of a vertical supporting member or pedestal 37.

A second wheel 40 is mounted no the shaft 28 and has a plurality of ledges 41 adapted to receive the articles from the support formed by the bars 35 and 36 and from the showing in Fig. 3 it will be noted that the wheel 40 comprises a pair of spaced disks 40a and 40b, these disks being disposed outside of the support formed by the bars 35 and 36.

As the articles are delivered from the bars or paddles 23 to the support formed by the bars 35 and 36, they will be successively pushed along the bars 35 and 36 by the outer ends of the paddles or bars 23. The rates of rotation of the wheels 20 and 30 are so timed that when a plurality of articles has been fed along the bars 35 and 36 the assembled articles will be picked up by the ledges 41 of the wheel 40 and will be rotated to deliver the articles to a platform 45 having an extension 46 which is disposed between the disks 40a and 40b. As successive sets of articles are delivered by the wheel 40 they will be disposed on the table 45 and will be fed along the table so that any desired number can be assembled.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. Feeding and stacking mechanism comprising means for supporting and feeding articles, an indexing wheel mounted on a horizontal axis and having a plurality of fixed, article supporting ledges at the delivery end of the supporting and feeding means to receive and support articles from the supporting means and to lift and feed the articles, a stationary support at the delivery side of the wheel to receive the articles from said wheel and to support a predetermined number of articles, a second wheel mounted on a horizontal axis and having rigid ledges arranged to engage lift and feed a predetermined number of articles from said stationary support, and a table adapted to receive said assembled articles from the second wheel.

2. Feeding and stacking mechanism comprising a support for articles to be fed and stacked, a rotatable wheel mounted on a horizontal axis and disposed in overlapping relation to the delivery end of said support and having a plurality of fixed, article supporting ledges at the delivery end of the supporting and feeding means to engage, support, lift and feed the articles, a second support disposed in overlapping relation to said wheel, on the delivery side thereof to receive the articles from the wheel, a second wheel mounted on a horizontal axis and disposed in overlapping relation to the second support and having rigid, article supporting ledges proportioned to receive a plurality of articles from the second support, and a table disposed in overlapping relation to the delivery side of the second wheel and arranged to receive articles therefrom.

References Cited in the file of this patent

UNITED STATES PATENTS

| | | |
|---|---|---|
| 2,247,175 | Orstrom | June 24, 1941 |
| 2,597,900 | Paynter | May 27, 1952 |
| 2,754,980 | Malhiot | July 17, 1956 |